CHURCH, OBERT, WILLOUGHBY & WILLOUGHBY.
Harvester.
No. 4,969. Patented Feb. 13, 1847.
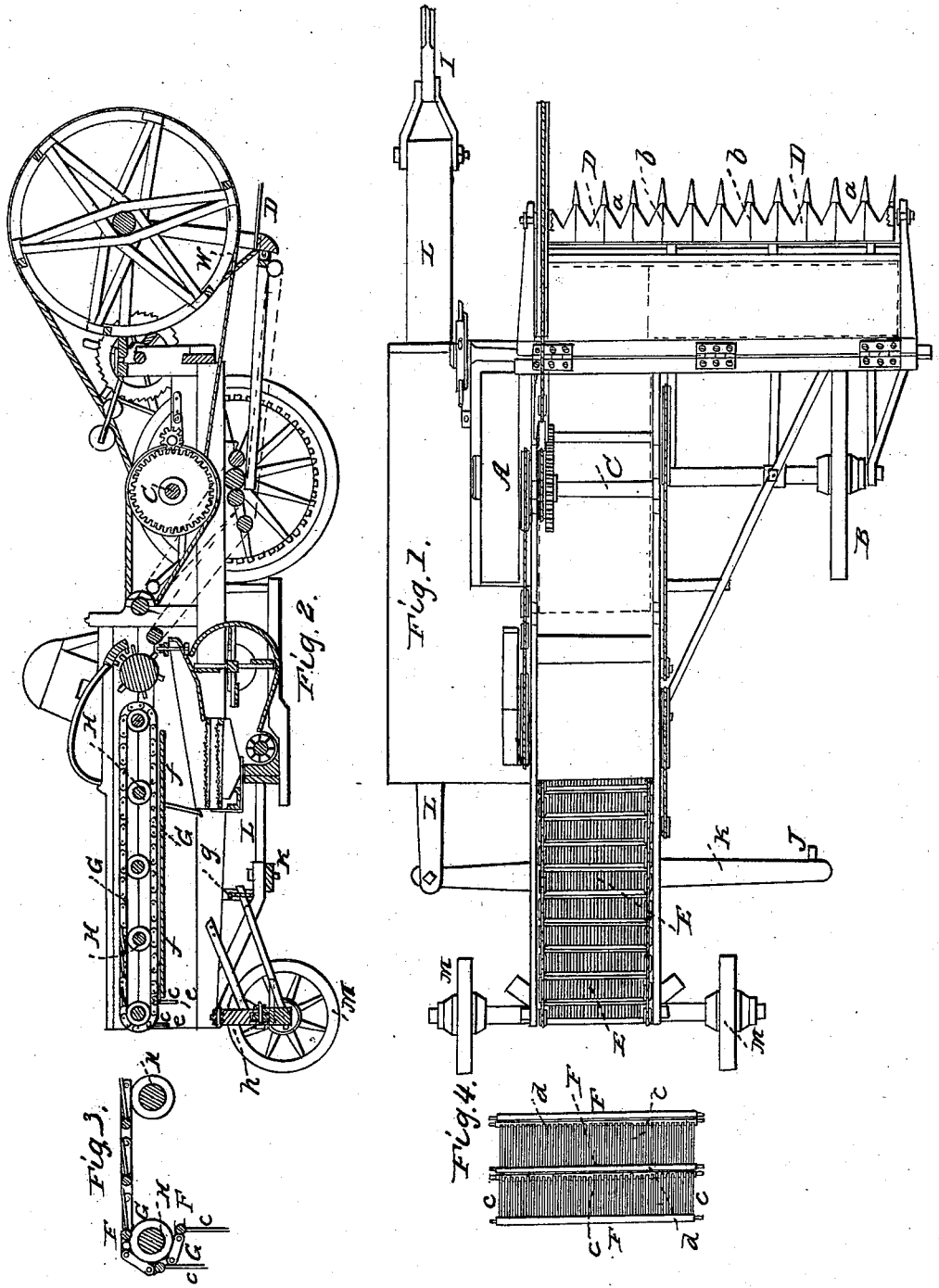

UNITED STATES PATENT OFFICE.

D. A. CHURCH AND L. H. OBERT, OF FRIENDSHIP, NEW YORK, AND W. W. WILLOUGHBY AND O. F. WILLOUGHBY, OF CHICAGO, ILLINOIS.

IMPROVEMENT IN THRASHING-MACHINES.

Specification forming part of Letters Patent No. 4,969, dated February 13, 1847.

*To all whom it may concern:*

Be it known that we, DAMON A. CHURCH and LOVETT H. OBERT, of Friendship, in the county of Allegany and State of New York, WESTON W. WILLOUGHBY and O. F. WILLOUGHBY, of Chicago, in the county of Cook and State of Illinois, have invented a new and useful improvement in the manner of constructing a machine for cutting, thrashing, and cleaning grain, said improvement having more particular reference to the machine for which Damon A. Church obtained Letters Patent of the United States under date of the 4th day of May, 1841, but its use is not limited to this particular machine.

In the accompanying drawings, Figure 1 is a top view of our machine, what is denominated the "gathering-wheel," by which the grain is forced against the cutters, being removed for the purpose of distinctly showing the parts below it. This gathering-wheel as used in the present machine is substantially the same with that described and represented in the patent of D. A. Church above referred to. Fig. 2 is a vertical longitudinal section, taken through the middle of the machine. The end of the gathering-wheel is shown in place at W in this figure.

In the machine patented by Damon A. Church motion was given to the cutting and cleaning apparatus by the friction of the two main bearing-wheels upon the ground. In our improved machine we employ but one of these wheels for that purpose, which wheel has teeth on the inside of its periphery that mesh into a pinion on the shaft C, and thereby communicate motion to the apparatus, as in the original machine, the other wheel B being left loose on the axle in the ordinary manner. When both wheels were made to operate on the machinery, it was found extremely difficult to steer the machine correctly. We obviate this difficulty by making the fixed or driving wheel A of considerable width on its tread—say double that of the loose wheel B, more or less. This driving-wheel is made strong and weighty, and, as the main weight of the whole machine is toward that side on which the wheel A is placed, the friction of it upon the ground has been found sufficient for driving the machinery without its slipping, and without employing spikes or points projecting out from its periphery, a plan which has been resorted to in some machines, and which might be employed in this should the peculiar nature of the ground appear to require it. By dispensing with the mode of steering formerly used, and attaining this end in a manner to be presently described, the employment of one hand is saved.

We have made an improvement in the manner of forming the cutting knives or blades D D. It has been heretofore the practice to make these cutters unite together at their interior angles, as at $a\ a$ in the drawings, there being a joint between each contiguous knife in that part. It has been found, however, that although made with care, the joint was liable to become open, and the straw to pass into the space so formed. We now construct our knives so as to be solid in that part, the joinings between them being situated at $b\ b$, by which this difficulty is entirely obviated; but for this improvement we, under a decision of the Patent Office, apply for separate Letters Patent.

The important improvement which we now claim is in the manner of constructing the separator which separates the straw from the grain. The separator E E we carry by means of an endless chain, G G, at each side of the machine, these chains being sustained upon rollers H H, Figs. 2 and 3, Fig. 3 being an enlarged view of a part of the separator and chain, as shown in the position in which it is represented in Fig. 2. Fig. 4 is also an enlarged view of the separator in a top view, as shown in Fig. 1.

F F is a series of rods that cross from one endless chain G G to the other and which turn on pivots in said chain. These rods F F have teeth $c\ c$ in them which may be of wood or metal and stand out from their respective rods like the teeth of a comb, which we will therefore call "combs." These teeth may be six or eight inches, more or less, in length. When these combs are on the upper part of the separator, the points of their teeth will rest on the rod F of the next contiguous comb, or upon a small rod, $d\ d$, nearly in contact with it, and crossing the separator for that purpose. As these combs pass over the rear rollers, H', they will turn on their pivots and hang down vertically, as shown at $e\ e$ in Figs. 2 and 3, thus removing all obstructions in that part to the falling of the straw that has passed between the teeth when the combs were in a horizontal position. By falling into this vertical position the straw that may have become entangled in the teeth will fall from and clear them, and thus prevent its tendency to become choked. The chains, as they pass over the rollers H H, receive from them an undulating motion, which insures the dropping of any grain through the upper part of the separator that may have accompanied the straw, which will consequently fall upon the floor or slide which is situated close under the separator. The place of this floor is shown at $ff$, Fig. 2. It extends along nearly as far forward as the endless chain. When the combs come into contact with the rear end of this floor, they are drawn over it in such manner as to carry the short straw and grain which have fallen through, and these are scraped forward by the rods F F, that rest upon the floor, and are subjected to the action of the fanning-mill. At the front termination of the floor $ff$ the combs again fall into a vertical position, and they are thereby again cleared from any straw which may have become entangled on their teeth.

The thrashing-machine and the fanning-wheel and other parts of the apparatus for cleaning the grain are constructed and operate substantially with those used in the original machine of D. A. Church.

The steering is effected in the present machine by the aid of the horse without the employment of a hand for that purpose, or of any apparatus of the kind used in the machine of which this is an improvement. The horses are to be hitched at I and J, respectively, the part I being connected to the swingle-tree K by a long slide, L L, and the swingle-tree turning on a bolt in the usual manner. The hind wheels, M M, swing freely on a bolt, $g$, Fig. 2, the axle bearing in a friction-roller at $h$.

Having thus fully described the nature of our improvement in the within-described harvesting-machine, what we claim as new therein, and desire to secure by Letters Patent, is—

The manner herein set forth of constructing the separator so that it shall consist of separate combs turning on pivots in endless chains and operating in the manner herein made known.

DAMON A. CHURCH.
LOVETT H. OBERT.
WESTON W. WILLOUGHBY.
O. F. WILLOUGHBY.

Witnesses to the signatures of D. A. Church and L. H. Obert:
ANDREW C. BUSKIRK,
WILLIAM H. KING.

Witnesses to the signatures of W. W. Willoughby and O. F. Willoughby:
H. L. RUCKER,
P. HARROUN.